April 21, 1936.   C. McKENDRICK   2,037,812
PIPE JOINT
Filed Dec. 14, 1934

INVENTOR
CHARLES McKENDRICK
BY Francis E. Boyce
ATTORNEY

Patented Apr. 21, 1936

2,037,812

UNITED STATES PATENT OFFICE 2,037,812

PIPE JOINT

Charles McKendrick, Edinburgh, Scotland

Application December 14, 1934, Serial No. 757,430
In Great Britain March 9, 1934

1 Claim. (Cl. 285—79)

My invention relates to pipe joints of the kind in which a double conical tubular connector or nipple, and a conically bored rotatable sleeve is employed, and has for its object to improve the construction and action of such joints.

According to my invention the joint consists of an internally tapered and non-detachable sleeve free to revolve, and positioned within an externally threaded bush adapted to engage with a binding or coupling member internally threaded for a part of its length and provided with an internal shoulder, the remaining internal part, or a portion of that part, being tapered to receive one end of a double conical tubular connector or nipple.

When coupling up two pipes, the adjoining ends are, as usual, expanded, and the bush with the non-detachable sleeve is drawn over one of the pipes on to its expanded end, whilst the binding or coupling member is drawn on the other pipe until its internally tapered surface surrounds the expanded end of this pipe, and one end of the double conical connector or nipple is inserted in the expanded pipe end. The bush, with the sleeve, is now screwed home in the binding or coupling member with the result that the other end of the connector or nipple is forced into the expanded end of the first mentioned pipe.

In order that my said invention and the manner of performing the same may be properly understood I hereunto append a sheet of explanatory drawings to be hereinafter referred to in describing my invention.

Figure 1:
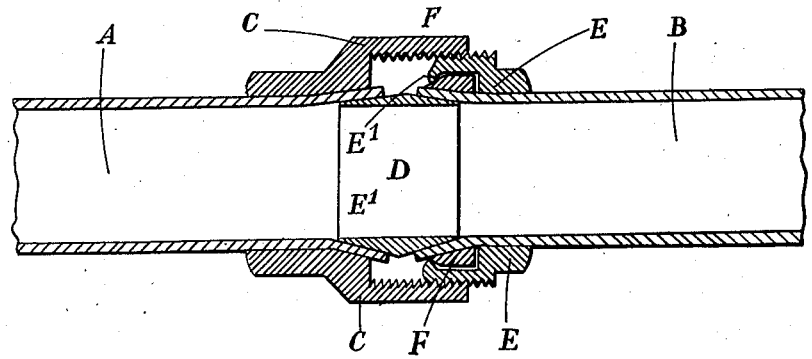
Figure 2:
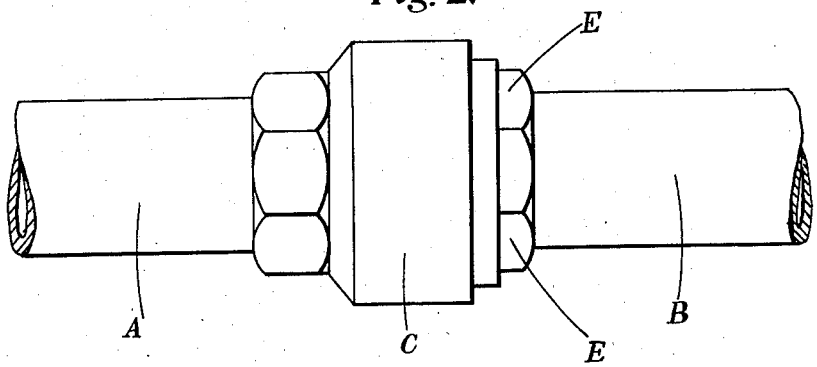
Figure 3:
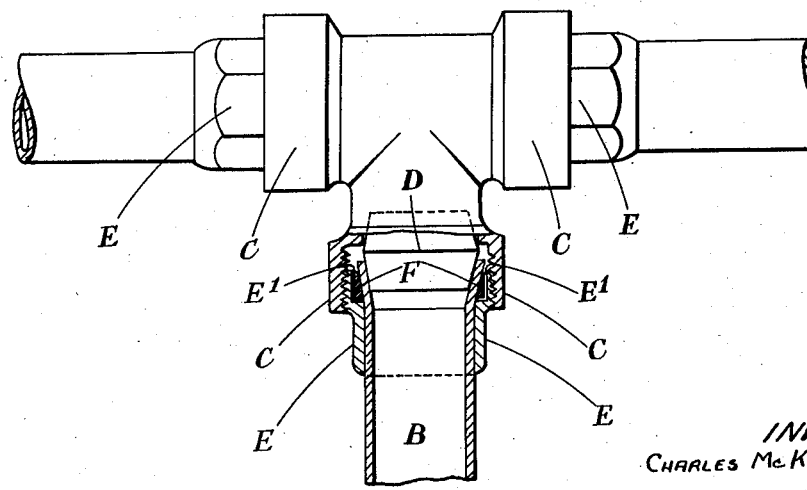

Figure 1 is a section of the improved joint for coupling two pipes, and Figure 2 is a side elevation. Figure 3 shows the improved joint as applied to a T-piece coupling. In the drawing the same reference letters are used to mark the same or like parts wherever they are repeated.

As shown in Figures 1, and 2, the adjoining ends of the pipes A, and B, to be coupled are, as usual, expanded, and the internally tapered coupling member C, is drawn on to the expanded end of the pipe A, and the double conical tubular connector or nipple D, is placed in position. The externally threaded bush E, with the internally tapered and non-detachable sleeve F, which is free to revolve, is now drawn on to the expanded end of the pipe B, and the bush E, is screwed home in the coupling member C, with the result that the connector or nipple D, is forced into the expanded ends of the pipes A, and B, which are respectively gripped between the internal tapered surface of the coupling member C, and the connector or nipple D, and the non-detachable sleeve F, and the connector or nipple D. The sleeve F, is retained in the bush E, by slightly pressing in the inner edge $E^1$, of the latter, after the sleeve has been placed in position in the bush E.

As shown in Figure 3, the improved pipe joint is shown as applied for coupling pipes to a T-piece. In this case one end of the connector or nipple D, is inserted in and bears directly against the internally tapered portion of the coupling member C, into which the bush E, with the non-detachable sleeve F, is screwed, and the joint is completed as hereinbefore described with reference to Figures 1, and 2.

By constructing a pipe joint in the manner just described, pipes can be readily and effectively coupled to each other, or to a T-piece or the like, whilst the outside diameter of the completed joint is substantially reduced. Further, the improved coupling can be set close up against a wall or other surface, as the bush E, is screwed into the coupling member C, which does not revolve.

What I claim is:—

A pipe joint in which a double conical tubular connector is employed, consisting of an internally tapered and non-detachable sleeve free to revolve and positioned within an externally threaded bush adapted to engage with a binding or coupling nut internally threaded for a part of its length the remaining internal part of the binding or coupling nut or a portion of that part being tapered, the forward end of the sleeve being exteriorly tapered and the exteriorly threaded bush having at its forward end an inwardly turned lip in engagement with the tapered surface of the sleeve thereby to prevent separation of the sleeve from the bush.

CHARLES McKENDRICK.